Feb. 26, 1963   J. R. OISHEI ET AL   3,078,492
WINDSHIELD CLEANING APPARATUS
Filed July 30, 1959   2 Sheets-Sheet 1

INVENTORS
JOHN R. OISHEI and
BY MARTIN BITZER

Bean Brooks Buckley & Bean
ATTORNEYS

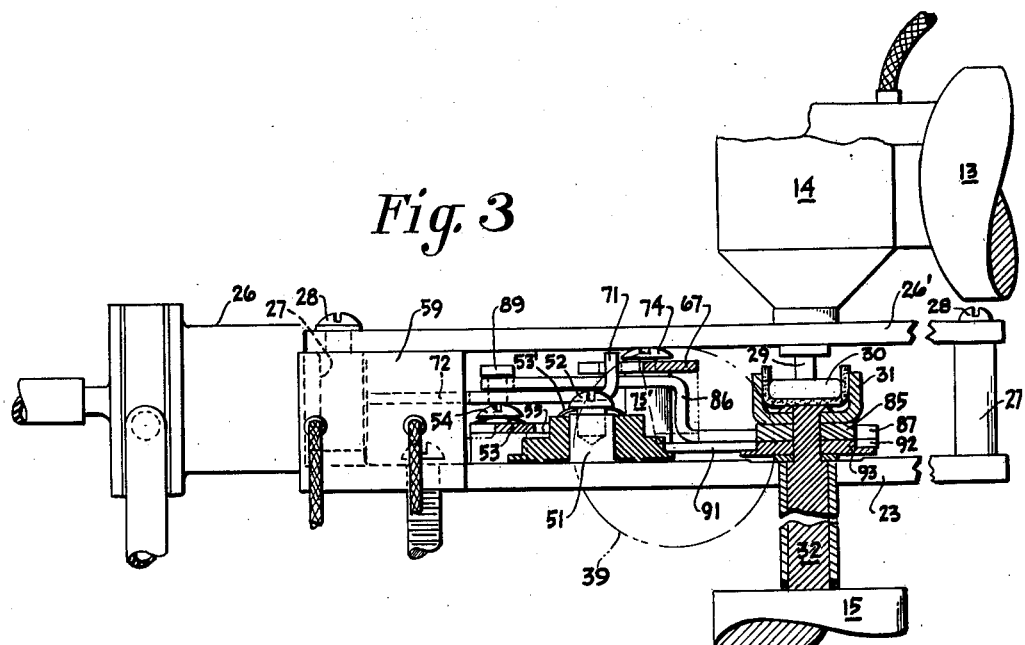
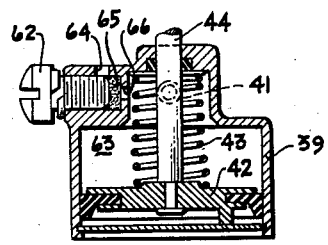
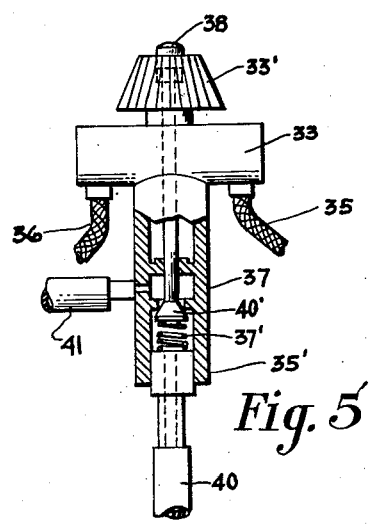
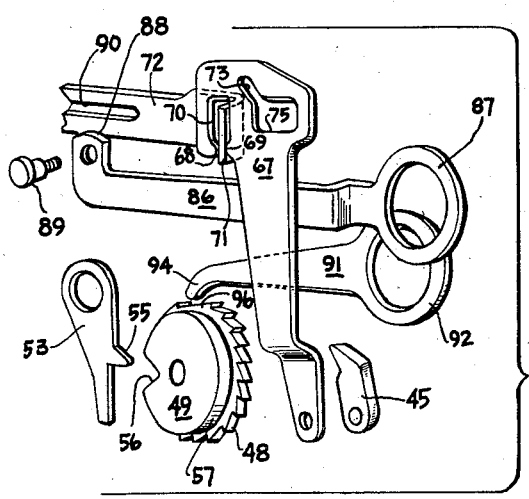

United States Patent Office 3,078,492
Patented Feb. 26, 1963

3,078,492
WINDSHIELD CLEANING APPARATUS
John R. Oishei, Buffalo, and Martin Bitzer, Kenmore, N.Y., assignors to Trico Products Corporation, Buffalo, N.Y.
Filed July 30, 1959, Ser. No. 830,542
4 Claims. (Cl. 15—250.02)

The present invention relates to an improved windshield cleaning system of the type which cleans a windshield by providing a joint action of a solvent and windshield wipers thereon.

It is the primary object of the present invention to provide a self-contained mechanical-pneumatic combined windshield washer pump and control unit which may be installed as an adjunct of and which is adapted to be partly actuated by a windshield wiper motor of any type for the purpose of providing, in precise timed relationship, an interrupted stream of solvent of definite duration and a predetermined number of cycles of wiper operation during a windshield cleaning operation.

Another object of the present invention is to provide an improved construction for a coordinated wiper-motor driven washer arrangement wherein a unitary control member serves a multiplicity of functions, namely, initiating operation of the wiper motor, coupling the output of the wiper motor to the washer pump, and timing the duration of joint wiper motor and pump operation. The use of a single control for all of the foregoing purposes contributes toward a lower cost and increased dependability of operation of a windshield cleaning system.

A still further object of the present invention is to provide a self-contained combined washer pump and timing unit of the above type which is economical because it may be installed either by a vehicle owner or at the factory, in either event without in any way interfering with separate operation of any of the windshield wiper motors with which it may be associated. Other objects and attendant advantages of the present invention will readily be perceived hereafter.

The improved windshield cleaning arrangement of the present invention consists of a mechanical-pneumatic self-contained combined solvent pump and control unit for providing a coordinated windshield cleaning operation. Because the self-contained unit is driven by the mechanical output of the wiper motor, it can therefore be used equally well in conjunction with wiper motors of the electric, pneumatic or hydraulic types. In accordance with the present invention, a base member containing a washer pump and mechanical-pneumatic timing and control mechanism is adapted to be positioned proximate the wiper unit and is coupled to the output thereof. When a washing operation is desired, the vehicle operator need merely actuate a control which places the wiper motor into operation, initiates action of timing mechanism on the base member to time the duration of wiper motor operation, drives the washer pump from the wiper motor output, and times the length of joint washer-wiper operation. More specifically, the control and timing mechanism is a pneumatic motor in which a piston is moved by manifold vacuum against the bias of a spring to a first position wherein it causes starting of operation of the wiper motor which, as noted above, drives the washer pump. When the wiper motor operates, it will drive the pump and cause it to provide an interrupted stream of solvent to the windshield. A mechanical timing arrangement is actuated by motion produced by the wiper motor to cause the windshield wipers to be actuated for a predetermined number of cycles and then automatically stopped. The above-noted spring in the pneumatic motor tends to bias the piston back to its original position. However, the piston moves at a controlled rate depending on the adjustment of a bleed screw which controls the rate at which air passes into the evacuated motor chamber. The above-noted motor timing mechanism will maintain the washer pump in operation for a portion of the total time that the windshield wipers are in operation and then uncouple the connection between the wiper motor and the washer pump, thereby terminating the operation of the washer pump, while permitting the wiper motor to continue in operation. The wiper action is automatically terminated by the mechanical timing mechanism driven thereby, as described above. The structure of the washer pump is such that it always stops after it has taken in a charge of solvent so that it will be able to project this solvent immediately on the initiation of a subsequent windshield cleaning cycle. Whenever the wiper motor is actuated by itself, the above-described combined timing and pumping mechanism will remain dormant and will in no way interfere with normal operation of the wiper motor.

The self-contained unit which contains the above-described control mechanism and the washer pump may easily be applied as an adjunct to an existing wiper system to provide precise coordinated washer and wiper operation in an economical manner. Furthermore, either the wiper motor or the self-contained timing-pumping unit may be readily replaced as a unit without requiring replacement of the other. The present invention will be more fully understood when the following portions of the specification are read in conjunction with the accompanying drawings wherein:

FIG. 3 is a view partly taken along line III—III of FIG. 2;

FIG. 4 is an exploded perspective view of certain portions of the timing and pumping structure of the present invention;

FIG. 5 is a view, partially in cross-section, of a control valve which may be used for actuating the cleaning system; and FIG. 6 is a view, partially in cross-section, taken along line VI—VI of FIG. 2 and showing the timing mechanism for providing a predetermined length of washer pump operation.

Figure 1:
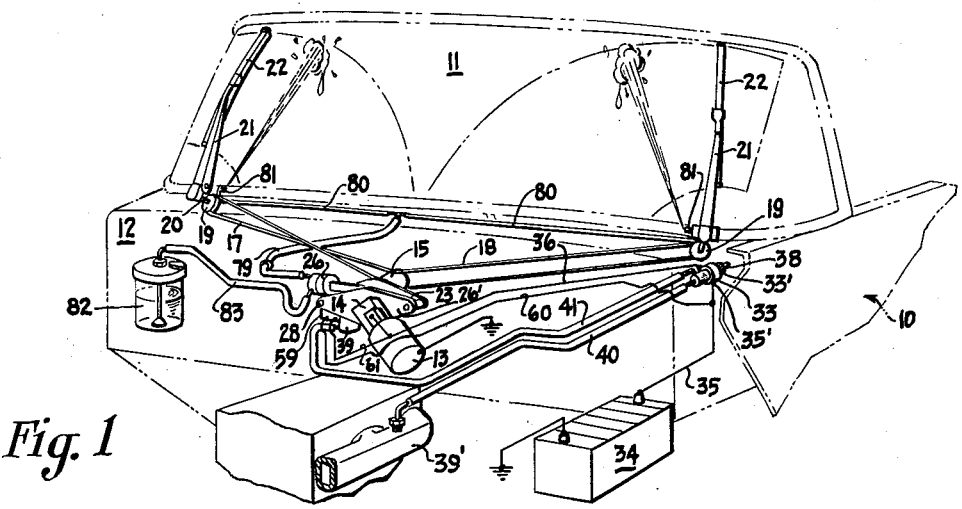
FIG. 1 is a fragmentary perspective view of an automotive vehicle incorporating the present invention.

In FIG. 1, an automotive vehicle 10 is shown having a windshield 11 mounted thereon. A wiper unit is provided having a motor 13 coupled to gear box 14 for oscillating a drum 15. The oscillation of drum 15 is transmitted to pulleys 19 through cables 17 and 18. Pulleys 19, in turn, are mounted on rockshafts 20 which, in turn, mount wiper arms 21 which carry wiper blades 22. As is well understood in the art, whenever the wiper unit is placed in operation, motor 13, which is suitably mounted, as on firewall 12, will cause blades 22 to oscillate across the windshield.

In accordance with the present invention, the self-contained timing and pumping unit includes a base member 23 (FIGS. 1, 2, and 3) having apertures 24 therein for receiving screws 25 which affix the base member to mounting structure (not shown) on the vehicle. Base member 23, which may be in the form of a plate, carries a mechanism which both coordinates the operation of the windshield washer and the wiper motor, as well as times the duration of operation of each, and also carries a washer pump unit 26 for projecting an interrupted stream of solvent under high pressure onto windshield 11. The wiper motor 13 is suitably mounted on a bracket 26' (connections not shown) which is adapted to be secured to lugs 27 on base 23 by screws 28. It is to be noted that shaft 29 (FIG. 3) extending from gear box 14 has a rectangular universal drive member 30 attached thereto which is adapted to be received in channel 31 that is fixedly secured to shaft 32, which, in turn, is suitably journaled in base 23. It will therefore readily be appreciated that whenever motor 13 causes gear box 14 to produce oscillation of shaft 29, drum 15 will oscillate correspondingly to drive wipers 22 in the above-described manner.

Whenever it is desired to cause the wiper unit to operate without the washer to clear the windshield during rainy weather, it is only necessary to manipulate knob 33' (FIG. 5) to close the single-pole single-throw switch 33 for the purpose of causing current to flow from battery 34 to electric motor 13 through leads 35 and 36, it being appreciated that both the battery and motor are grounded to complete the circuit. Switch 33 forms a part of a combined washer and wiper switch 35', but it will readily be understood that it may be separate therefrom if desired.

Figure 2:
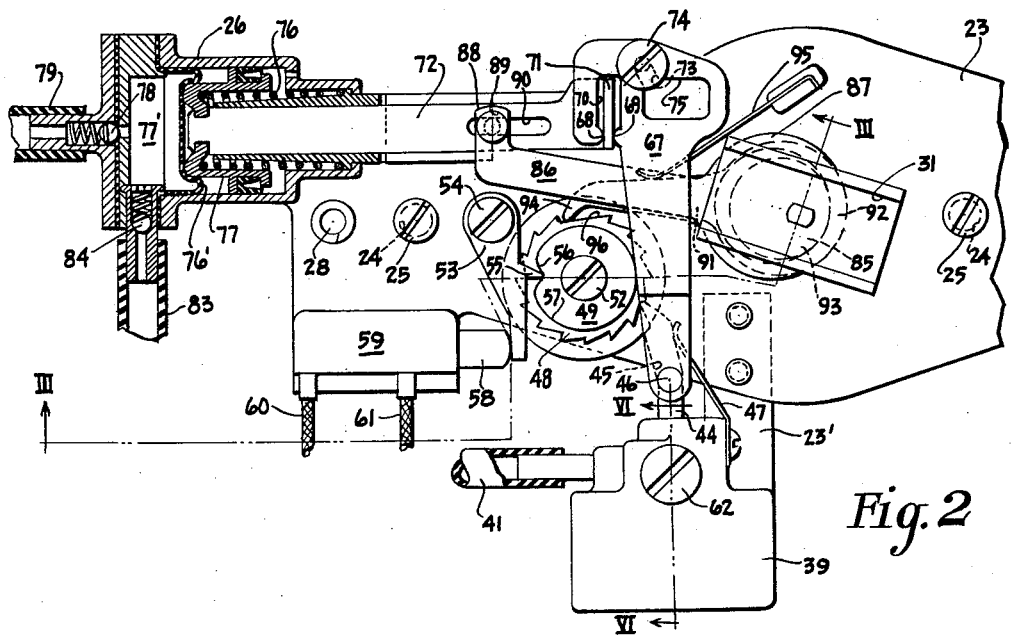
FIG. 2 is an enlarged view in elevation showing the improved structure of the present invention.

Whenever it is desired to effect a windshield cleaning operation, button 38 of switch 37 (FIGS. 1 and 5) is momentarily depressed to unseat valve 40' to permit manifold vacuum to communicate with fluid pressure motor 39 through conduits 40 and 41 which extend between motor 39 and manifold 39'. Motor 39 (FIG. 2) is attached to base member 23 by bracket 23'. The evacuation of motor 39 in the above-described manner will cause piston 42 therein (FIG. 6) to be drawn upwardly against the bias of spring 43, and this upward movement will be accompanied by a corresponding upward movement of motor shaft 44 affixed to piston 42. Affixed to the end of shaft 44, which is remote from piston 42, is a pawl 45 adapted to pivot about pin 46 coupling it to the shaft. A positive stop (not shown) may be provided between pawl 45 and shaft 44 to limit movement of the pawl in a counterclockwise direction. A spring 47, mounted on the housing of motor 39, tends to bias pawl 45 in a counterclockwise direction (FIG. 2). Whenever motor 39 is actuated in the foregoing manner, a stroke counting mechanism will be set in operation, the same including a pawl 45 to engage one of the tenth of ratchet wheel 48, which is integrally formed with cam 49 thereon. The ratchet-cam assembly 48—49 is journaled for rotation on stub shaft 51 (FIG. 3), and is held in position thereon by screw 52 and spring washer 53'. Ratchet cam assembly 48—49, in conjunction with cam followers described hereafter, constitutes a timing-coordinating arrangement for determining both the length and relative times of operation of both the washer pump and wiper unit.

The upward movement of pawl 45 in the foregoing manner will cause counterclockwise movement of ratchet cam assembly 48—49 a distance of one ratchet tooth. This is sufficient to cause cam follower arm 53 (FIGS. 2 and 4) to pivot in a clockwise direction (FIG. 2) about the axis of screw 54 which secures it to base member 23. The foregoing action is obtained because protuberance 55 of follower 53 will move from notch 56 in cam 49 onto portion 57 thereof, which is concentric with the axis of rotation of the cam. The foregoing movement of cam follower 53 will result in the end thereof which is remote from screw 54 engaging stem 58 of microswitch 59 which is mounted on base member 23. When microswitch 59 is closed in the foregoing manner, a circuit will be completed from battery 34 to wiper motor 13 through leads 35 and 60, microswitch 59, and lead 61, it being appreciated that the required ground connections are provided as shown. In the foregoing manner, operation of wiper motor 13 is initiated.

Substantially simultaneously with the energization of motor 13 in the above-described manner, washer pump 26 is energized in such a manner that it is driven in timed relationship to the operation of wiper motor 13 by the following pump operating mechanism. More specifically, link 67 (FIGS. 2 and 4) has the lower end thereof pivotally mounted on pin 46 attached to motor shaft 44.

The upper end of link 67 has guide members 68 and 69 formed on opposite sides of slot 70. Guide members 68 and 69 bear on opposite sides of flange 71 which extends at right angles from pump shaft 72. A slot 73, which is also provided in link 67, is adapted to receive the neck of guide bolt 74 which is attached to lug 75' extending upwardly from base member 23. It can readily be seen, therefore, that after motor shaft 44 has been caused to move to its uppermost limit, link 67 will be caused to move upwardly a corresponding amount and this upward movement will be guided by the sliding relationship between bolt 74 and slot 73. At its limit of upward movement, guides 68 and 69 of link 67 will engage the top of flange 71 of pump shaft 72, and the stem of bolt 74 will lie within elongated slot 75 of link 67. Immediately upon the release of contact between slot 73 and bolt 74, pump shaft 72 will be pushed toward the left in FIG. 2 by the expansion of spring 76 which extends between pump piston 77 and the housing of pump 26. A flexible diaphragm 76' is suitably affixed to, and forms a part of, piston 77. As shown, diaphragm 76' is in the nature of a rolling seal between the pump housing and piston 77. The initial movement of piston 77 will cause the solvent which is stored in pump chamber 77' to be moved past check valve 78, through conduits 79 and 80, and nozzles 81, onto a windshield 11. This preliminary squirting action occurs slightly before the wiper motor 13 is placed in operation in the above manner. Thereafter, pump piston 77 is caused to reciprocate many times during a windshield cleaning cycle to project an interrupted stream of solvent onto the windshield. In this respect, it is to be noted that a solvent reservoir 82 is suitably secured on the vehicle, and as piston 77 moves to the right, a charge of solvent will be taken into chamber 77' through conduit 83 and past check valve 84. When piston 77 moves to the left, the charge of solvent in chamber 77' is expelled, as described above.

Pump shaft 72 is caused to move to the right to provide an intake stroke for pump 26 in the following manner: An eccentric disc 85 (FIG. 3) is rigidly secured to shaft 32. A collar 87, which is at one end of an arm or link 86, encircles disc 85. As disc 85 oscillates with shaft 32, link 86 will be caused to oscillate because of the above-described eccentric connection. The end 88 of link 86 has a pin 89 mounted thereon to be received in slot 90 of pump shaft 72 for reciprocating the latter. It can therefore be seen that as link 86 moves to the right, pin 89 will engage the right side of slot 90 and move pump shaft 72 to the right, also, against the bias of spring 76. As link 86 moves to the left, spring 76 will expand to expel solvent from chamber 77', as described above. It can thus be seen that pump 26 is caused to operate in timed relationship to the oscillation of shaft 32 which drives the windshield wipers.

The wiper motor 13 is maintained in operation for a predetermined number of wiper strokes in the following manner: A timing pawl 91 has one end thereof formed onto a collar 92 which encircles eccentric disc 93 on shaft 32. Therefore, as shaft 32 oscillates, timing pawl 91 will oscillate accordingly. The end 94 of timing pawl 91 is biased against pawl 48 by spring 95. The end 94 of pawl 91 will engage each successive tooth of ratchet 48 with each of its movements to the left to thereby drive ratchet 48 and cam 49 counterclockwise in a stepwise manner. The operation of wiper motor 13 will continue until such time as cam 49 again returns to the position wherein notch 56 therein will again receive protuberance 55 of cam follower 53. When this condition is reached, a spring (not shown) within microswitch 59 will bias stem 58 to an off position, and parking mechanism associated with motor 13 will cause it to park in the well known manner.

It is to be especially noted that the washer pump terminates operation long before the wiper motor stops. This insures that an adequate dry-wipe cycle is provided to wipe excess moisture from the windshield. This coordination is achieved in the following manner: When button 38 of washer switch 37 is released, valve 40' in the switch returns to the position shown in FIG. 5 under the urging of spring 37' to terminate communication between conduits 40 and 41. A bleed screw 62 (FIGS. 2 and 6) permits the metering of air into evacuated chamber 63 of motor 39 at a predetermined controlled rate (depending on the adjustment of the bleed screw). The controlled bleed is effected through aperture 64, filter 65, and aperture 66. As the atmosphere communicates with chamber 63, spring 43 will cause piston 42 to return to the position shown in FIG. 6 from the upper position it occupied immediately after actuation of switch 37. The downward movement of piston 42 is accompanied by a corresponding downward movement of motor shaft 44 and link 67 attached thereto. During the downward movement of link 67, the reciprocation of link 72 in the above-described manner will be permitted as long as the stem of bolt 74 is within slot 75 in link 67. However, a time will be reached during the downward movement of link 67 that the stem of bolt 74 is caused to enter slot 73 to arrest movement of pump shaft 72. At this time the movement of link 86 to the left (FIG. 2) which actuates pump shaft 72 will not be accompanied by a corresponding movement of the latter, because guides 68 and 69 will hold flange 71 against horizontal reciprocatory movement and thereby prevent shaft 72 from moving to the left under the urging of spring 76. Therefore, pin 89 in link 86 will merely move back and forth in slot 90. After guides 68 and 69 initially stop pump shaft 72 from horizontal reciprocatory movement, continued downward movement of link 67 will cause pump shaft 72 to move to the right to its position shown in FIG. 2 because of the action of cam slot 73. In this position, the right end of slot 90 is beyond the normal distance of travel of pin 89. It will also be noted that pump shaft 72 stops in an extreme right hand position so that chamber 77' contains a charge of solvent for immediate discharge at the initiation of a subsequent windshield cleaning operation, as described above. As noted above, the above-described cycle of washer operation is effected in a predetermined time which is less than the time required for ratchet wheel 48 and cam 49 to travel through an entire revolution. As noted above, the remainder of time that ratchet wheel 48 is driven by driving pawl 91 determines the length of the dry wipe cycle.

Operation of motor 13 is terminated when protuberance 55 of cam follower 53 falls into notch 56 of cam 49, as described above. However, it is to be noted that when this occurs, the tip 94 of timing pawl 91 will be in position on elongated tooth 96 which is of a greater length than the length of travel of tip 94. In other words, in this position, the driving pawl 91 is idly reciprocated, and will not engage the depending portion of tooth 96 to drive ratchet wheel 48. The foregoing structure is for the purpose of permitting wiper motor 13 to operate without accompanying operation of washer pump 26 when this is necessary. More specifically, it can readily be seen that when shaft 32 oscillates during wiper motor operation, driving pawl 91 will be caused to oscillate also. However, as noted above, since tooth 96 is of greater length than the length of stroke of timing pawl 91, operation of motor 13 will not be accompanied by operation of pump 26. It is only when fluid pressure motor 39 is actuated in the manner described above to move ratchet wheel 48 in a counterclockwise direction that oscillation of timing pawl 91 will engage the ratchet teeth which are to the right of elongated tooth 96 to provide a timing cycle which operates in the above-described manner.

From the foregoing description it can readily be seen that motor 39 serves as a unitary control having a multiplicity of functions, namely, initiating operation of the wiper motor, coupling the output of the wiper motor to the pump, and timing the duration of joint wiper motor and pump operation.

It will be especially noted that the coupling arrangement 30—31 which is utilized between the wiper motor and the shaft which carries driving drum 15 permits either an electric, hydraulic or pneumatic wiper motor to be utilized for providing the type of operation described in detail above.

It will further be appreciated that in lieu of microswitch 59, a pneumatic valve may be used if the motor is of the pneumatic type, or a hydraulic valve may be used if the motor is of the hydraulic type. Even if the foregoing substitutions are made, it can readily be appreciated that they will in no way complicate the basic mode of operation of the pumping and timing structure.

While preferred embodiments of the present invention have been disclosed, it is to be readily understood that the present invention is not to be limited thereto, but may be otherwise embodied within the scope of the following claims.

What is claimed is:

1. A windshield cleaning system comprising a wiper unit including a wiper motor, a wiping element, and transmission means therebetween; a combined pump and coordinator unit constituting an entity separate and distinct from said wiper unit and adapted to be mounted proximate thereto, said combined pump and coordinator unit comprising a base, a shaft journaled for rotary motion in said base, a pump mounted on said base, means on said shaft adapted to be coupled to said wiper motor output whereby said wiper motor drives said shaft, a linkage for selectively coupling said shaft and said pump, and unitary coordinating means mounted on said base for providing operation of said wiper motor and for causing said linkage to couple said shaft to said pump and timing the duration of joint pump and wiper motor operation and terminating operation of said pump prior to wiper motor operation.

2. A windshield cleaning system as set forth in claim 1 wherein said unitary coordinating means comprises a fluid pressure motor having a controlled bleed therein and wherein said fluid pressure motor permits said wiper motor to drive said pump for a period of time depending on the length of time required for fluid to pass through said controlled bleed.

3. A windshield cleaning system comprising a wiper unit including a wiper motor, a wiping element, and transmission means therebetween; a combined pump and coordinator unit constituting an entity separate and distinct from said wiper unit and adapted to be mounted proximate thereto; first control means for producing sole operation of said wiper unit without accompanying operation of said combined pump and coordinator unit; second control means for providing joint operation of said wiper unit and said combined pump and said coordinator unit; said combined pump and coordinator unit comprising a base, a shaft journaled in said base, a pump mounted on said base, means on said shaft adapted to be coupled to said wiper motor output whereby said wiper motor drives said shaft, linkage means for selectively coupling said shaft and said pump, unitary means mounted on said base member and responsive to the manipulation of said second control means for starting said wiper motor and for causing said linkage to drive said pump from motion obtained from said shaft and for determining the length of joint wiper unit and pump operation and for disconnecting said linkage thereby permitting said wiper unit to continue in operation without accompanying pump operation, said linkage including means to permit said wiper motor to operate without producing accompanying operation of said pump when said first control means are actuated.

4. A winshield cleaning system comprising a wiper unit including a wiper motor, a wiping element, and transmission means therebetween; a combined pump and coordinator unit constituting an entity separate and distinct from said wiper unit and adapted to be mounted proximate thereto; first control means for producing sole operation of said wiper unit without accompanying operation of said combined pump and coordinator unit; second control means for providing joint operation of said wiper unit and said combined pump and said coordinator unit; said combined pump and coordinator unit comprising a base, a shaft journaled in said base, a pump including a pump shaft mounted on said base, means on said shaft adapted to be coupled to said wiper motor output whereby said wiper motor drives said shaft, eccentric means mounted on said shaft, a first strap mounted on said eccentric means, coupling means for selectively coupling said first strap to said pump shaft, a second strap coupled to said eccentric means, a ratchet and cam assembly mounted for rotation on said base, a pawl driven by said second strap for selectively driving said ratchet, unitary coordinating means mounted on said base member and responsive to the manipulation of said second control means for rotating said ratchet and cam assembly and thereby starting said wiper motor and for causing said coupling means to couple said first strap to said pump shaft to thereby drive said pump from the output of said wiper motor and for maintaining said coupling means in coupling condition for a predetermined time period and thereafter terminating such coupling condition while permitting said wiper motor to continue in operation after said pump operation has terminated, said coupling means for selectively coupling said first strap to said pump shaft including means for permitting said wiper motor to operate without producing accompanying operation of said pump when said first control means are actuated.

References Cited in the file of this patent
UNITED STATES PATENTS

| | | |
|---|---|---|
| 2,878,505 | Ziegler | Mar. 24, 1959 |
| 2,905,962 | Ziegler | Sept. 29, 1959 |
| 2,959,803 | Ziegler | Nov. 15, 1960 |